United States Patent
Chang et al.

(10) Patent No.: US 6,759,772 B1
(45) Date of Patent: Jul. 6, 2004

(54) FASTENING STRUCTURE FOR SECURING STATOR OF MOTOR

(75) Inventors: Shun-chen Chang, Taipei (TW); Kuo-cheng Lin, Taoyuan (TW); Wen-shi Huang, Jungli (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 10/437,145

(22) Filed: May 12, 2003

(30) Foreign Application Priority Data

Dec. 18, 2002 (TW) ...................... 91220620 U

(51) Int. Cl.$^7$ ................................................ H02K 7/14
(52) U.S. Cl. ...................................... 310/67 R; 310/90
(58) Field of Search ....................... 310/254, 90, 67 R

(56) References Cited

U.S. PATENT DOCUMENTS

| | | | |
|---|---|---|---|
| 3,919,572 A | * 11/1975 | Desy ........................... | 310/45 |
| 4,647,803 A | * 3/1987 | von der Heide et al. ..... | 310/51 |
| 5,363,003 A | * 11/1994 | Harada et al. ............ | 310/67 R |
| 5,436,519 A | * 7/1995 | Takahashi et al. .......... | 310/217 |
| 5,663,604 A | * 9/1997 | Takahashi .................... | 310/91 |
| 6,107,717 A | * 8/2000 | Lin et al. ..................... | 310/90 |

* cited by examiner

Primary Examiner—Dang Le
Assistant Examiner—Nguyen N Hanh
(74) Attorney, Agent, or Firm—Pro-Techtor International Services

(57) ABSTRACT

A fastening structure for securing a stator of a motor includes a copper sleeve with a notch thereon and a fastener. The fastener is composed of a position section and a hook section, wherein the hook section engages with the notch and the position section presses on the top surfaces of the coil bobbin of the stator.

17 Claims, 6 Drawing Sheets

FASTENING STRUCTURE FOR SECURING STATOR OF MOTOR

BACKGROUND OF THE INVENTION

1. Field of the Invention

The invention relates to a fastening structure for the stator of a motor and, in particular, to a fastening structure for the stator of a motor, which can prevent the stator from falling off by means of a fastener.

2. Description of the Related Art

The stator of a motor is liable to fall off if the assembly strength of the motor is not high enough to withstand the continuous vibration during a long period of operation. In view of this, if one can provide a fastening structure compatible with conventional parts of a motor, the assembly strength of the motor can be enhanced significantly at low cost.

SUMMARY OF THE INVENTION

In view of the above, an objective of the invention is to provide a fastening structure for securing the stator of a motor, which enhances the assembly strength of a motor by a fastener engaging with a copper sleeve and thus the stator can be tightly secured to the motor during operation.

Another objective of the invention is to provide a fastening structure for securing the stator of a motor, which can protect the coil by a special design of a fastener.

According to an embodiment of the invention, a fastener includes a position section and a hook section. The two sides of the position section of the fastener are designed to respectively touch the copper sleeve and the top surface of the coil bobbin. The copper sleeve is machined on its side surface to form a notch at a specific distance from the top surface of the copper sleeve, which is designed to be substantially the same as the distance from the position section to the end surface of the hook section. Therefore, when the hook section is inserted into the notch, the two sides of the position section tightly press against the copper sleeve and the top surface of the coil bobbin so as to enhance the assembly strength and establish a firm connection.

According to another embodiment of the invention, one side of the position section adjacent to the coil bobbin is extended to the extent that it can cover the whole coil of the stator, which prevents the friction between the coil and the rotor so as to protect the coil.

According to still another embodiment of the invention, a first notch is formed on the copper sleeve, and a second notch is formed inwardly at the bottom of the first notch. The first notch and second notch together form an L-shaped notch to accommodate the hook section of the fastener. When the hook section is inserted into the L-shaped notch of the copper sleeve, the two sides of the position section press tightly against the copper sleeve and a top surface of the silicon steel sheet covering the coil to secure the stator of the motor.

Furthermore, the fastener may be of a circular structure, an arc structure or a combination of a plurality of arc structures having the same center and radius.

DETAILED DESCRIPTION OF THE PREFERRED EMBODIMENT

The fastening structure for securing the stator of a motor according to an embodiment of the invention will be described hereinbelow with reference to the accompanying drawings, wherein the same reference numbers refer to the same components.

Figure 1:
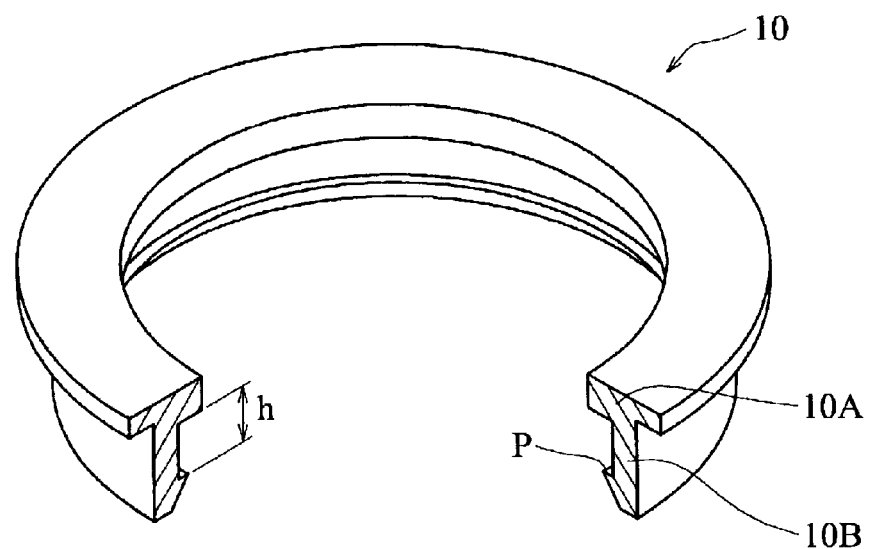
FIG. 1 is a perspective cross sectional view showing a fastener 10 of the fastening structure according to an embodiment of the invention.

FIG. 1 is a perspective cross sectional view showing a fastener 10 of the fastening structure according to an embodiment of the invention. As shown in FIG. 1, the fastener 10 with a circular shape is composed of a position section 10A and a hook section 10B, which are integrally formed by molding. Each of the two sides of the position section 10A has a particular thickness that depends on which component of the motor is to be assembled with. The hook section 10B has an end surface P, and the distance h from the position section 10A to the end surface P of the hook section 10B is as indicated in FIG. 1.

Figure 2:
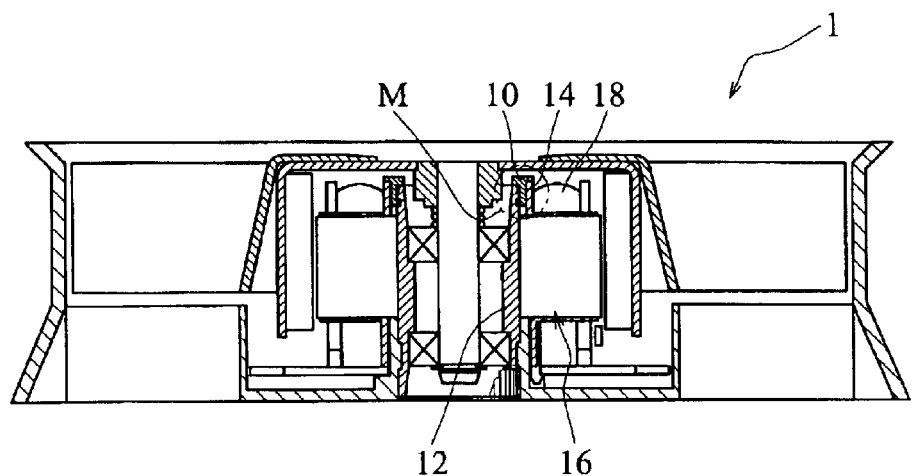
FIG. 2 is a sectional view showing the connection of the fastener 10 and components of a motor 1 according to an embodiment of the invention.
Figure 3:
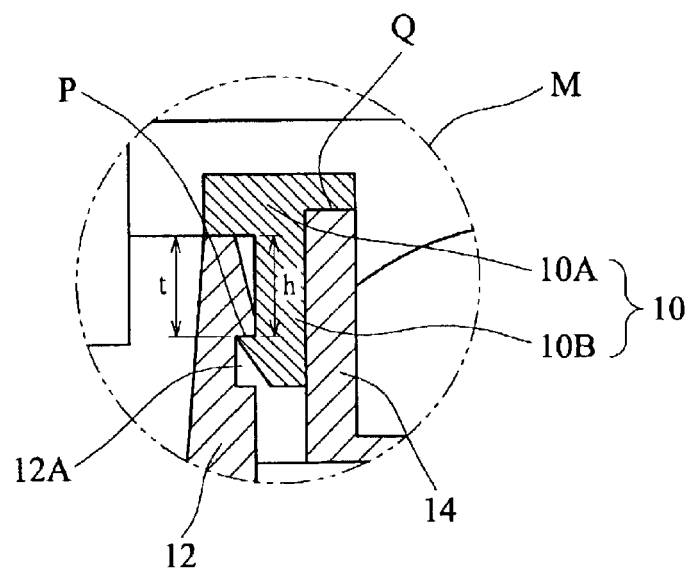
FIG. 3 is an enlarged cross-section M of the fastener 10 shown in FIG. 2, which illustrates more clearly the design of the fastening structure according to the embodiment of the invention.

FIG. 2 is a sectional view showing the connection of the fastener 10 and components of a motor 1 according to an embodiment of the invention. FIG. 3 is an enlarged cross-section M of the fastener 10 shown in FIG. 2, which illustrates more clearly the design of the fastening structure according to the embodiment of the invention.

As shown in FIG. 2, the stator 16 of the motor 1 includes a coil bobbin 14 and a coil 18. In this embodiment, the two sides of the fastener 10 connect the copper sleeve 12 of the motor and the coil bobbin 14 of the stator 16, respectively. More specifically, the two sides of the position section 10A of the fastener 10 are designed to respectively touch the copper sleeve 12 and the top surface of the coil bobbin 14 as shown in FIG. 3. The copper sleeve 12 is machined on its side surface to form a notch 12A at a distance t from its top surface. the distance t is designed to be substantially the same as the distance h from the position section 10A to the end surface P. Therefore, when the hook section 10B is inserted into the notch 12A, the two sides of the position section 10A tightly press against the copper sleeve 12 and the top surface of the coil bobbin 14 so as to establish a firm connection.

The vibration during the operation of the motor may cause the stator 16 to fall off due to an upward force acting thereon. Therefore, the fastening structure of this embodiment can solve the problem in the most effective way. By inserting the end surface P of the hook portion 10B into the notch 12B, the resulting force with which the position section 10A presses against the coil bobbin 14 counteracts the upward force that acts on the stator 16 at point Q during vibration. Therefore, the assembly strength can be enhanced significantly, and the stator 16 can thus be tightly secured to the motor.

Figure 4:
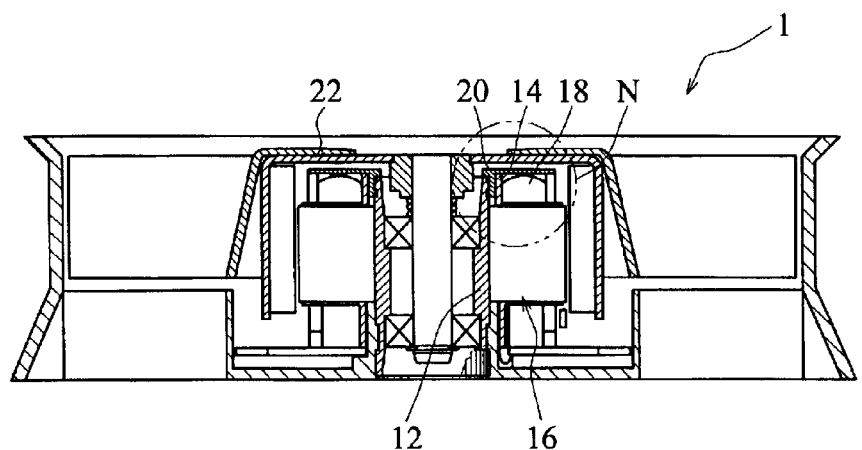
FIG. 4 is a sectional view showing the connection of the fastener 20 and the components of the motor 1 according to another embodiment of the invention.
Figure 5:
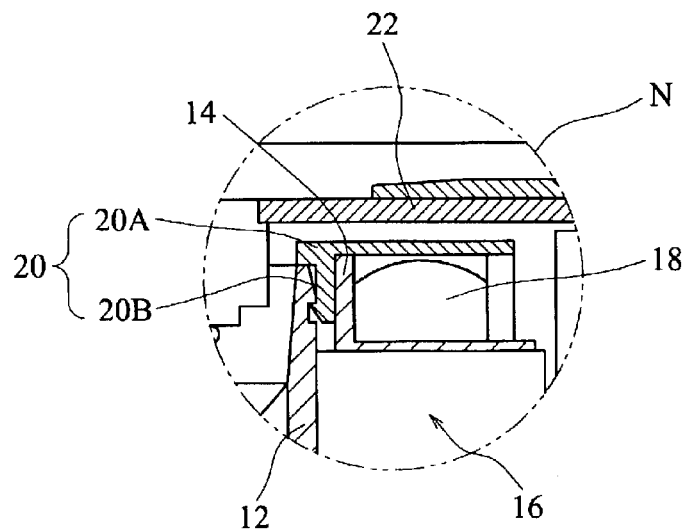
FIG. 5 is an enlarged cross-section N of the fastener 20 shown in FIG. 4.

FIG. 4 is a sectional view showing the connection of the fastener 20 and the components of the motor 1 according to another embodiment of the invention. FIG. 5 is an enlarged cross-section N of the fastener 20 shown in FIG. 4.

In this embodiment, the side of the position section 20A adjacent to the coil bobbin 14 is extended to the extent that it can cover the whole coil 18 of the stator 16, which prevents the friction between the coil 18 and the rotor 22 so as to protect the coil 18.

Figure 6:
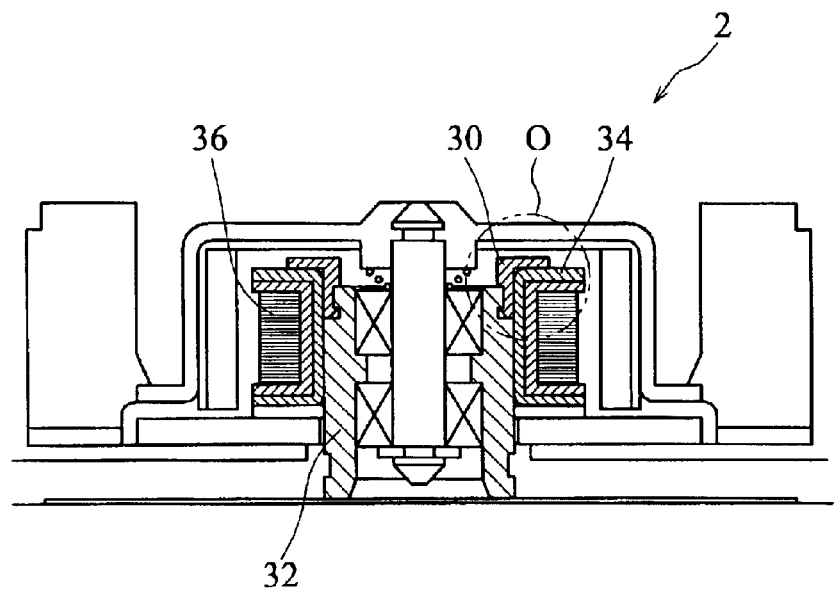
FIG. 6 is a sectional view showing another motor 2, with the arrangement of components different from that of the motor 1, incorporating the fastener structure of the invention.
Figure 7:
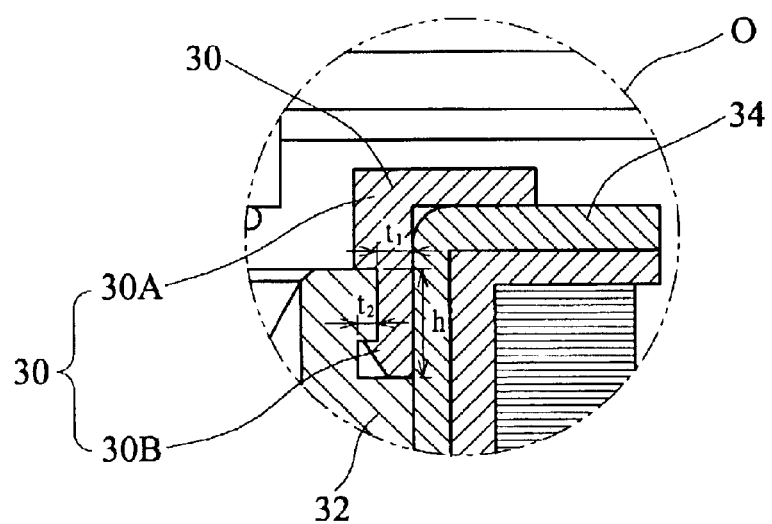
FIG. 7 is an enlarged cross-section O of the fastener 30 shown in FIG. 6.

FIG. 6 is a sectional view showing another motor 2, with the arrangement of components different from that of the motor 1, incorporating the fastener structure of the invention. FIG. 7 is an enlarged cross-section O of the fastener 30 shown in FIG. 6. As shown in FIG. 6, the motor 2 includes a copper sleeve 32 and a silicon steel sheet. 34 for securing a coil 36, with the copper sleeve 32 touching the silicon steel sheet 34. As shown in FIG. 7. The copper sleeve 32 of this embodiment is formed with a first notch having a width t1 and a height h, and then inwardly is formed with a second notch with a depth t2 at the bottom of the first notch. The first notch and second notch together form an L-shaped notch on the side surface of the copper sleeve 32 to accommodate the hook section 30B of the fastener 30. When the hook section 30B is inserted into the L-shaped notch, the two sides of the position section 30A respectively press against the copper sleeve 32 and the top surface of the silicon steel sheet 34 so as to secure the stator of the motor 2.

In view of the above, the invention can be implemented in various kinds of motors each having different arrangement of components simply by changing the notch type formed on the copper sleeve and modifying the shape of the fastener. Although the motor 1 and the motor 2 are both outer-rotor motors, one having ordinary skill in the art should understand that the invention can be also implemented in an inner-rotor motor.

Figure 8:
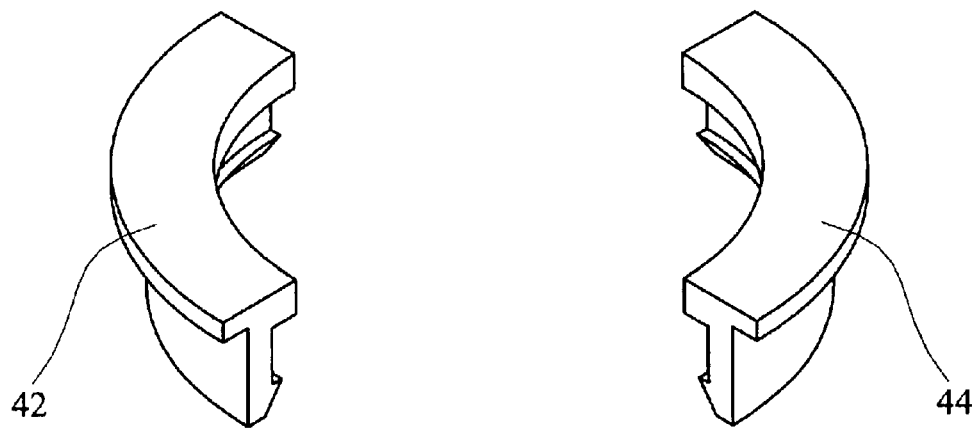
FIG. 8 is a perspective cross sectional view showing a fastener according to still another embodiment of the invention.

FIG. 8 is a perspective cross sectional view showing a fastener of the fastening structure according to still another embodiment of the invention. The shape of the fastener according to the invention includes but is not limited to a circular shape. For example, as shown in FIG. 8, a pair of arc structures 42 and 44 having the same center and radius can be provided between the copper sleeve and the stator to achieve the objective of securing the stator and protecting the coil. Of course, one can only provide a single arc structure between the copper sleeve and the stator.

Figure 9:
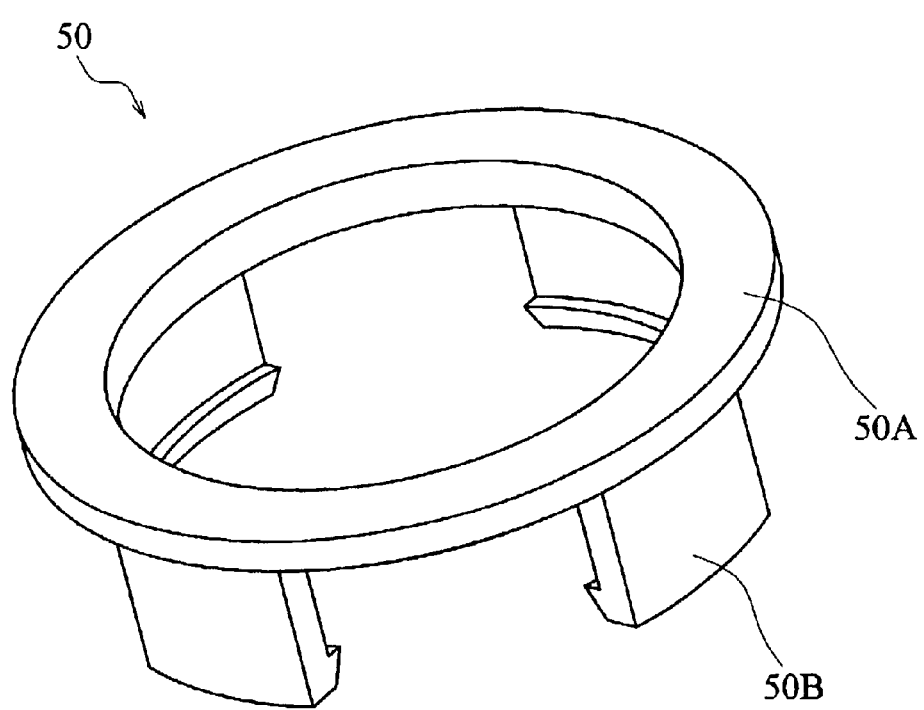
FIG. 9 is a perspective view showing another modification of the fastener structure according to the invention.

Moreover, FIG. 9 shows another modification of the fastener structure, where the position section 50A of the fastener 50 has a circular shape while the hook section 50B thereof is composed of a plurality of arc structures having the same center and radius. It is understood that the number of the arc structures shown in FIG. 8 and FIG. 9 is not limited, but to satisfy the demand for a firm connection.

While the invention has been described by way of example and in terms of the preferred embodiment, it should be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fastening structure for securing a stator of a motor, comprising:
    a copper sleeve having a notch; and
    a fastener having a position section and a hook section, the hook section being inserted into the notch, and the position section pressing against the top surface of the stator and the copper sleeve.

2. The fastening structure according to claim 1, wherein the side of the position section pressing against the stator extends to cover the coil of the stator.

3. The fastening structure according to claim 1, wherein the fastener has a circular shape.

4. The fastening structure according to claim 1, wherein the fastener is in the shape of an arc.

5. The fastening structure according to claim 1, wherein the fastener is a combination of a plurality of arc structures having the same center and radius.

6. The fastening structure according to claim 1, wherein the position section of the fastener has a circular shape end the hook section thereof is composed of a plurality of arc structures having the same center and radius.

7. The fastening structure according to claim 1, wherein the fastener is integrally formed by molding.

8. A fastening structure for securing a stator of a motor, the stator having a coil bobbin; the fastening structure comprising:
    a copper sleeve having a notch formed laterally and inwardly on the side surface of the copper sleeve, the notch keeping a specific distance from the top surface of the copper sleeve; and
    a fastener having a position section and a hook section, the hook section being inserted into the notch, and the position section pressing against the top surface of the stator and the copper sleeve.

9. The fastening structure according to claim 8, wherein the fastener has a circular shape.

10. The fastening structure according to claim 8, wherein the fastener is in the shape of an arc.

11. The fastening structure according to claim 8, wherein the fastener is a combination of a plurality of arc structures having the same center and radius.

12. The fastening structure according to claim 8, wherein the fastener is integrally formed by molding.

13. A fastening structure for securing a stator of a motor, the stator having a silicon steel sheet to secure a coil of the motor, the fastening structure comprising:
    a copper sleeve having a first notch and a second notch formed inwardly at the bottom of the first notch, the first notch and second notch together forming an L-shaped notch; and
    a fastener having a position section and a hook section, the hook section being inserted into the L-shaped notch, and the position section pressing against the top surface of the silicon steel sheet and the copper sleeve.

14. The fastening structure according to claim 13, wherein the fastener has a circular shape.

15. The fastening structure according to claim 13, wherein the fastener in the shape of an arc.

16. The fastening structure according to claim 13, wherein the fastener is a combination of a plurality of arc structures having the same center and radius.

17. The fastening structure according to claim 13, wherein the fastener is integrally formed by molding.

* * * * *